US00RE50473E

(19) United States
(12) Reissued Patent
Dix et al.

(10) Patent Number: US RE50,473 E
(45) Date of Reissued Patent: Jul. 1, 2025

(54) ESTIMATION OF TERRAMECHANICAL PROPERTIES

(71) Applicant: CNH Industrial America LLC, New Holland, PA (US)

(72) Inventors: Phillip Duane Dix, Westmont, IL (US); Daniel Geiyer, Bolingbrook, IL (US); Aditya Singh, Bolingbrook, IL (US); Navneet Gulati, Naperville, IL (US)

(73) Assignee: CNH Industrial America LLC, New Holland, PA (US)

(21) Appl. No.: 18/125,570

(22) Filed: Mar. 23, 2023

Related U.S. Patent Documents

Reissue of:
(64) Patent No.: 11,572,074
Issued: Feb. 7, 2023
Appl. No.: 16/882,193
Filed: May 22, 2020

(51) Int. Cl.
*B60W 40/101* (2012.01)
*G01S 19/51* (2010.01)
*G07C 5/08* (2006.01)

(52) U.S. Cl.
CPC ..... *B60W 40/101* (2013.01); *G07C 5/0808* (2013.01); *B60W 2300/15* (2013.01); *B60W 2530/20* (2013.01); *B60W 2556/50* (2020.02); *G01S 19/51* (2013.01)

(58) Field of Classification Search
CPC .... B60W 40/12; B60W 40/101; B60W 50/14; B60W 50/0097; G07C 5/0808
See application file for complete search history.

(56) References Cited

U.S. PATENT DOCUMENTS

| | | | | |
|---|---|---|---|---|
| 7,193,559 | B2 | 3/2007 | Ford et al. | |
| 7,454,290 | B2 | 11/2008 | Alban et al. | |
| 9,168,831 | B2 * | 10/2015 | Chang | B60W 30/18172 |
| 9,182,035 | B2 * | 11/2015 | Jeong | F16H 61/0204 |
| 9,340,211 | B1 | 5/2016 | Singh | |
| 10,011,284 | B2 | 7/2018 | Berntorp et al. | |
| 10,247,816 | B1 | 4/2019 | Hoffmann et al. | |

(Continued)

FOREIGN PATENT DOCUMENTS

EP 3 318 422 A1 5/2018

OTHER PUBLICATIONS

Jiang, et al, "A New Adaptive H-Infinity Filtering Algorithm for the GPS/INS Integrated Navigation", Sensors, Dec. 19, 2019, pp. 1-16, vol. 16.

(Continued)

*Primary Examiner* — Luke S Wassum
(74) *Attorney, Agent, or Firm* — Rickard K. DeMille; Rebecca L. Henkel; Peter K. Zacharias

(57) ABSTRACT

A system for estimating tire parameters for an off-road vehicle in real time, the system including a processing circuit including a processor and memory, the memory having instructions stored thereon that, when executed by the processor, cause the processing circuit to measure a position of the vehicle at a first time, determine, based on the position, motion characteristics of the vehicle, predict, based on the motion characteristics, a position of the vehicle at a second time, measure a position of the vehicle at the second time, and generate a tire parameter associated with the vehicle based on the predicted position and the measured position of the vehicle at the second time.

19 Claims, 6 Drawing Sheets

(56) References Cited

U.S. PATENT DOCUMENTS

| | | | | |
|---|---|---|---|---|
| 10,360,476 | B2 | 7/2019 | Steinhardt et al. | |
| 10,442,439 | B1 | 10/2019 | Seo et al. | B60W 40/00 |
| 10,713,863 | B2 * | 7/2020 | Jeon | G07C 5/085 |
| 10,821,981 | B1 * | 11/2020 | Funke | B62D 7/159 |
| 11,119,482 | B2 * | 9/2021 | Zhang | G05B 6/02 |
| 11,225,234 | B2 * | 1/2022 | Ueno | B60W 10/04 |
| 11,472,414 | B2 * | 10/2022 | González Aguirre | B60W 40/10 |
| 11,794,590 | B2 * | 10/2023 | Hwang | B60W 10/08 |
| 2005/0217906 | A1 * | 10/2005 | Spark | B62D 9/00 180/22 |
| 2010/0114449 | A1 * | 5/2010 | Shiozawa | B62D 6/005 701/90 |
| 2014/0277926 | A1 | 9/2014 | Singh et al. | |
| 2017/0336515 | A1 * | 11/2017 | Hosoya | G01C 21/28 |
| 2018/0245922 | A1 | 8/2018 | Zaphir et al. | |
| 2018/0276832 | A1 | 9/2018 | Aikin | |
| 2019/0071086 | A1 * | 3/2019 | Gorczowski | B60W 30/18 |
| 2019/0193730 | A1 * | 6/2019 | Voorheis | B60W 50/0097 |
| 2019/0266813 | A1 * | 8/2019 | Jeon | G07C 5/0841 |
| 2020/0348212 | A1 * | 11/2020 | Mori | B60C 11/246 |
| 2021/0116915 | A1 * | 4/2021 | Jiang | G05D 1/0088 |
| 2021/0170812 | A1 * | 6/2021 | Chen | B60C 23/0486 |
| 2021/0300132 | A1 * | 9/2021 | Sams | B60T 8/1725 |

OTHER PUBLICATIONS

Kok, et al, "Using Inertial Sensors for Position and Orientation Estimation", Foundations and Trends in Signal Processing, 2017, pp. 1-89, vol. 11, No. 1-2.

* cited by examiner

ESTIMATION OF TERRAMECHANICAL PROPERTIES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is an application for reissue of U.S. Pat. No. 11,572,074, which issued on Feb. 7, 2023, from U.S. application Ser. No. 16/882,193, filed May 22, 2020.*

BACKGROUND

The present disclosure relates generally to the field of vehicle control systems, and more particularly to a system and method of determining vehicle tire parameters for off-road vehicles.

SUMMARY

One implementation of the present disclosure is a system for estimating tire parameters for an off-road vehicle in real time, the system including a processing circuit including a processor and memory, the memory having instructions stored thereon that, when executed by the processor, cause the processing circuit to measure a position of the vehicle at a first time, determine, based on the position, motion characteristics of the vehicle, predict, based on the motion characteristics, a position of the vehicle at a second time, measure a position of the vehicle at the second time, and generate a tire parameter associated with the vehicle based on the predicted position and the measured position of the vehicle at the second time.

In some embodiments, the tire parameter is a cornering stiffness. In some embodiments, the tire parameter is a tire type. In some embodiments, the tire parameter is generated based on a correction factor associated with a difference between the predicted position and the measured position of the vehicle at the second time. In some embodiments, the correction factor is associated with an amount of tire slip associated with the difference between the predicted position and the measured position of the vehicle at the second time. In some embodiments, generating the tire parameter includes adjusting the correction factor to account for the difference between the predicted position and the measured position of the vehicle at the second time, wherein the adjusted correction factor is the tire parameter. In some embodiments, the difference between the predicted position and the measured position of the vehicle at the second time includes two or more parameters associated with the vehicle position and wherein the method includes weighting each of the two or more parameters based on a contribution each of the two or more parameters make to the difference between the predicted position and the measured position of the vehicle at the second time. In some embodiments, the vehicle is an agricultural vehicle. In some embodiments, measuring the position of the vehicle at the first and second times includes receiving position information from a GPS receiver associated with the vehicle. In some embodiments, the tire parameter is generated further based on vehicle characteristics associated with the vehicle. In some embodiments, the processing circuit is further configured to control an operation of the vehicle based on the tire parameter.

Another implementation of the present disclosure is a method of estimating tire parameters for an off-road vehicle in real time, the method including measuring a position of the vehicle at a first time, determining, based on the position, motion characteristics associated with the vehicle, predicting, based on the motion characteristics, a position of the vehicle at a second time, measuring a position of the vehicle at the second time, and generating a tire parameter associated with the vehicle based on the predicted position and the measured position of the vehicle at the second time.

In some embodiments, the tire parameter is a cornering stiffness. In some embodiments, the tire parameter is a tire type. In some embodiments, the tire parameter is generated based on a correction factor associated with a difference between the predicted position and the measured position of the vehicle at the second time. In some embodiments, the correction factor is associated with an amount of tire slip associated with the difference between the predicted position and the measured position of the vehicle at the second time. In some embodiments, generating the tire parameter includes adjusting the correction factor to account for the difference between the predicted position and the measured position of the vehicle at the second time, wherein the adjusted correction factor is the tire parameter. In some embodiments, the difference between the predicted position and the measured position of the vehicle at the second time includes two or more parameters associated with the vehicle position and wherein the method includes weighting each of the two or more parameters based on a contribution each of the two or more parameters make to the difference between the predicted position and the measured position of the vehicle at the second time. In some embodiments, the vehicle is an agricultural vehicle.

Another implementation of the present disclosure is an agricultural vehicle having one or more tires and a vehicle control system including a processor and memory, the memory having instructions stored thereon that, when executed by the processor, cause the processor to receive a position measurement associated with the agricultural vehicle at a first time, determine, based on the position, motion characteristics associated with the agricultural vehicle, generate, based on the motion characteristics, a predicted position of the agricultural vehicle at a second time, measure a position of the agricultural vehicle at the second time, and generate a cornering stiffness associated with at least one of the one or more tires based on a difference between the predicted position and the measured position of the agricultural vehicle at the second time.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Figure 1:
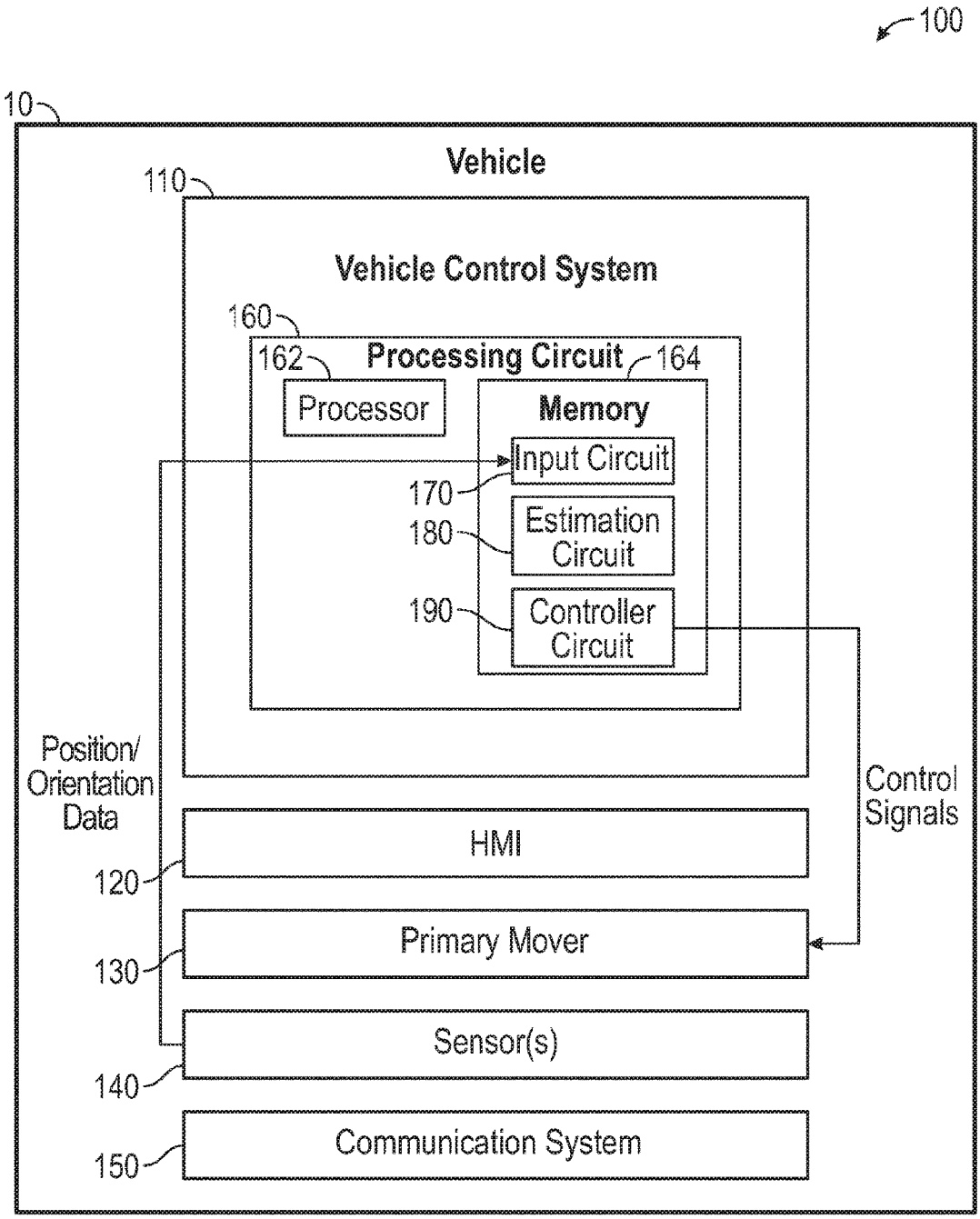
FIG. 1 is a block diagram of a vehicle having a vehicle control system, according to an exemplary embodiment.

Referring generally to the FIGURES, described herein are systems and methods of a vehicle control system. In various embodiments, the vehicle control system monitors a position of a vehicle and determines parameters associated with the vehicle based on the position of the vehicle. For example, in an off-road context, a vehicle (e.g., a tractor, etc.) may determine a slip angle and/or a tire stiffness associated with tires of the vehicle based on position information associated with the vehicle. As an additional example, in a construction context, a construction vehicle (e.g., a dump truck, an excavator, etc.) may display tire a tire stiffness to an operator. As an additional example, in an agricultural context, an agricultural vehicle (e.g., a combine harvester, a hauling vehicle, etc.) may use a slip angle as an input for a guided navigation system. In various embodiments, the vehicle control system receives inputs from one or more sources. For example, the vehicle control system may receive geospatial data from a global positioning system (GPS) receiver. In some embodiments, the vehicle control system analyzes the geospatial data to determine one or more position/orientation parameters (e.g., yaw, yaw rate, velocity, acceleration, heading, pitch, etc.). In various embodiments, the vehicle control system uses the one or more position/orientation parameters to predict a future position of the vehicle. For example, the vehicle control system may determine a predicted future heading and acceleration of the vehicle based on the current heading and acceleration of the vehicle. In various embodiments, the vehicle control system measures a difference between the predicted future position of the vehicle and a measured position of the vehicle at the future time. For example, the vehicle control system may determine that the vehicle is ten feet to the left of a predicted future position at the future time. In various embodiments, the vehicle control system analyzes the difference between the predicted future position of the vehicle and measured position of the vehicle at the future time to determine one or more vehicle parameters associated with the vehicle. For example, the vehicle control system may determine a slip angle between tires of the vehicle and the ground. In some embodiments, the vehicle control system may use the one or more vehicle parameters to operate the vehicle. For example, the vehicle control system may utilize the one or more vehicle parameters to determine control signals (e.g., a steering angle, acceleration, etc.) for a primary mover associated with the vehicle. Additionally or alternatively, the vehicle control system may send the one or more vehicle parameters to other systems. For example, vehicle control system may send the one or more vehicle parameters to a human-machine interface (HMI) associated with the vehicle for display to a user. As an additional example, vehicle control system may display the one or more vehicle parameters to a user in response to the one or more vehicle parameters exceeding a threshold and/or being out of a threshold range.

Hereinafter, example embodiments will be described in more detail with reference to the accompanying drawings.

Referring now to FIG. 1, a block diagram of a control environment 100 is shown, according to an exemplary embodiment. Control environment 100 is shown to include vehicle 10. In various embodiments, vehicle 10 is an off-road vehicle. For example, vehicle 10 may be an agricultural vehicle such as a hauling vehicle (e.g., a tractor, etc.), a harvesting vehicle (e.g., a combine harvester, etc.), and/or the like. As a further example, vehicle 10 may be a construction vehicle such as a loader (e.g., a front loader, a backhoe loader, etc.), a dump truck, and/or the like. Additionally or alternatively, vehicle 10 may be or include a number of different types of vehicles. While the vehicle control system of the present disclosure is described in relation to off-road vehicles, it should be understood that the vehicle control system is usable with other vehicles (e.g., non-off-road vehicles) and that such embodiments are within the scope of the present disclosure. As a non-limiting example, in a mixed context (e.g., on-road/off-road context, etc.), vehicle 10 may be a golf cart. As another non-limiting example, in an on-road context, vehicle 10 may be a winter service vehicle including a snowplow.

Vehicle 10 includes vehicle control system 110, human-machine interface (HMI) 120, primary mover 130, sensor(s) 140, and communication system 150. Vehicle control system 110 may determine vehicle parameters as described herein. In various embodiments, vehicle control system 110 is physically located with vehicle 10. For example, vehicle control system 110 may be or include a hardware component installed in vehicle 10. Additionally or alternatively, vehicle control system 110 may be located separately of vehicle 10. For example, vehicle control system 110 may be or include a cloud-processor configured to receive input from vehicle 10 and control vehicle 10 remotely.

HMI 120 may facilitate user interaction with vehicle 10 and/or vehicle control system 110. HMI 120 may include elements configured to present information to a user and receive user input. For example, HMI 120 may include a display device (e.g., a graphical display, a touchscreen, etc.), an audio device (e.g., a speaker, etc.), manual controls (e.g., manual steering control, manual transmission control, manual braking control, etc.), and/or the like. HMI 120 may include hardware and/or software components. For example, HMI 120 may include a microphone configured to receive user voice input and a software component configured to control vehicle 10 based on the received user voice input. In various embodiments, HMI 120 presents information associated with the operation of vehicle 10 and/or vehicle control system 110 to a user and facilitates user control of operating parameters. For example, HMI 120 may display operational parameters (e.g., fuel level, seed level, penetration depth of ground engaging tools, guidance swath, etc.) on a touchscreen display and receive user control input via the touchscreen display.

Primary mover 130 may generate mechanical energy to operate vehicle 10. For example, primary mover 130 may be or include an internal combustion engine. Additionally or alternatively, primary mover 130 may be or include an electric motor. In various embodiments, primary mover 130 is coupled to a frame of vehicle 10 and configured to provide power to a plurality of tractive elements (e.g. wheels, etc.). In various embodiments, primary mover 130 utilizes one or more fuels and/or energy storage systems (e.g., rechargeable batteries, etc.). For example, primary mover 130 may utilize diesel, gasoline, propane, natural gas, hydrogen, lithium-ion batteries, nickel-metal hydride batteries, lithium-ion polymer batteries, lead-acid batteries, nickel-cadmium batteries, and/or the like.

Sensor(s) 140 may monitor one or more parameters associated with vehicle 10. For example, sensor(s) 140 may monitor operation of primary mover 130 (e.g., torque, temperature, fuel level, airflow, etc.). Additionally or alternatively, sensor(s) 140 may monitor an environment of vehicle 10. For example, sensor(s) 140 may include cameras to view the surroundings of vehicle 10 and perform object recognition to facilitate obstacle avoidance. Sensor(s) 140 may include engine sensors, transmission sensors, chassis sensors, safety sensors, driver assistance sensors, passenger comfort sensors, entertainment systems sensors, and/or the like. In various embodiments, sensor(s) 140 monitor geospatial parameters associated with vehicle 10. For example, sensor(s) 140 may include a geolocation sensor (e.g., a GPS receiver, satellite navigation transceiver, etc.) configured to monitor a position of vehicle 10 (e.g., provide geolocation and/or time information, etc.). Sensor(s) 140 may measure an absolute position of vehicle 10 (e.g., a location, etc.), a relative position of vehicle 10 (e.g., a displacement, a linear travel, a rotational angle, etc.), and/or a three-dimensional position of vehicle 10. In some embodiments, sensor(s) 140 receive input from external sources. For example, sensor(s) 140 may include position sensors configured to communicate with one or more beacons located throughout a farm field to determine a location of vehicle 10. In various embodiments, sensor(s) 140 are physically located with vehicle 10. For example, sensor(s) 140 may include a chassis mounted infra-red sensor configured to measure crop health. Additionally or alternatively, sensor(s) 140 may be located separately of vehicle 10. For example, sensor(s) 140 may include a nitrogen sensor configured to measure soil nitrogen remotely of vehicle 10. Sensor(s) 140 may include hardware and/or software components. For example, sensor(s) 140 may include a GPS receiver configured to receive positional data and a software component configured to determine positional parameters associated with vehicle 10 (e.g., pose, speed, yaw, trajectory, etc.) based on the positional data. As another example, sensor(s) 140 may include an optical device (e.g., a camera, LIDAR sensor, etc.) configured to capture image data and a software component configured to classify obstacles based on the image data.

Communication system 150 may facilitate communication between vehicle 10 and/or vehicle control system 110 and external systems. Communication system 150 may be or include wired or wireless communications interfaces (e.g., jacks, antennas, transmitters, receivers, transceivers, wire terminals, etc.) for conducting data communications within control environment 100 and/or with other external systems or devices. In various embodiments, communications via communication system 150 is direct (e.g., local wired or wireless communications). Additionally or alternatively, communications via communication system 150 may utilize a network (e.g., a WAN, the Internet, a cellular network, a vehicle-to-vehicle network, etc.). For example, vehicle control system 110 may communicate with a decision support system (DSS) using a 4G and/or 5G connection (e.g., via a 4G or 5G access point/small cell base station, etc.) and may communicate with another vehicle using a dedicated short-range communication channel (e.g., a vehicular ad-hoc network, etc.). In some embodiments, communication system 150 facilitates vehicle-to-vehicle (V2V) and/or vehicle-to-everything (V2X) communication. For example, communication system 150 may facilitate communication between vehicle 10 and another vehicle using the IEEE 802.11p standard (e.g., a wireless access in vehicular environments (WAVE) vehicular communication system). In some embodiments, vehicle 10 communicates with external systems via Wi-Fi.

Referring now generally to vehicle control system 110, vehicle control system 110 offers many benefits over existing systems. Conventional vehicle parameter estimation systems typically require an array of sensors (e.g., to provide several sources of input data) to generate vehicle parameter estimations. For example, a conventional vehicle parameter estimation system may require an array of torque sensors distributed throughout a transmission and engine of a vehicle to facilitate parameter estimation. Such sensor array may be expensive. Furthermore, such sensors are difficult to retro-fit onto an existing vehicle, thereby limiting the application of conventional vehicle parameter estimation systems. Additionally, conventional vehicle parameter estimation systems typically require user calibration. For example, a conventional vehicle parameter estimation system may require a user to provide a tire type (e.g., what type/types of tire(s) are being used with the vehicle, etc.) and/or a database describing the characteristics of various tire types in different conditions (e.g., dry soil vs. wet soil, etc.). Requiring user calibration may be inconvenient to users. Furthermore, if a user forgets to properly calibrate a conventional system (e.g., the user changes a tire type on the vehicle without updating the system, etc.), then the system may produce false outputs. However, vehicle control system 110 described herein facilitates real time vehicle parameter estimation without the expensive sensor arrays or user calibration associated with conventional systems. That is, in various embodiments, vehicle control system 110 may determine vehicle parameters using positional data from a GPS transceiver. For example, vehicle control system 110 may receive geospatial data from a GPS receiver and use the geospatial data and known vehicle parameters (e.g., vehicle mass, vehicle size, etc.) to determine one or more parameters associated with interactions between the vehicle tires and the ground. In various embodiments, vehicle control system 110 eliminates the need for expensive sensor arrays associated with conventional systems. Therefore, vehicle control system 110 may facilitate retro-fitting existing vehicles and/or may facilitate less expensive vehicle parameter estimation than conventional systems. Furthermore, vehicle control system 110 may eliminate the need for continuous user calibration (e.g., updating a tire type every time the vehicle tires are changed, etc.) associated with conventional systems. Additionally, vehicle control system 110 may eliminate the need for databases describing the characteristics of various tire types in different conditions as associated with conventional systems.

Referring still to FIG. 1, vehicle control system 110 is shown to include processing circuit 160 having processor 162 and memory 164. In some embodiments, vehicle control system 110 includes one or more processing circuits 160 including one or more processors 162 and one or more memories 164. Each of processors 162 can be a general purpose or specific purpose processor, an application specific integrated circuit (ASIC), one or more field programmable gate arrays (FPGAs), a group of processing components, or other suitable processing components. Each of processors 162 is configured to execute computer code or instructions stored in memory 164 or received from other computer readable media (e.g., CDROM, network storage, a remote server, etc.).

Memory 164 may include one or more devices (e.g., memory units, memory devices, storage devices, or other computer-readable media) for storing data and/or computer code for completing and/or facilitating the various processes described in the present disclosure. Memory 164 may include random access memory (RAM), read-only memory (ROM), hard drive storage, temporary storage, non-volatile memory, flash memory, optical memory, or any other suitable memory for storing software objects and/or computer instructions. Memory 164 may include database components, object code components, script components, or any other type of information structure for supporting the various activities and information structures described in the present disclosure. Memory 164 may be communicably connected to processor(s) 162 via processing circuit 160 and may include computer code for executing (e.g., by processor 162) one or more of the processes described herein.

Memory 164 is shown to include input circuit 170, estimation circuit 180, and controller circuit 190. Input circuit 170 may facilitate receiving and processing of information from external sources. For example, input circuit 170 may receive position and/or orientation data from sensor(s) 140. In various embodiments, input circuit 170 may analyze input data to determine one or more parameters. For example, input circuit 170 may receive geospatial data from sensor(s) 140 over a period of time and determine, based on the geospatial data, one or more motion parameters associated with the vehicle (e.g., yaw rate, velocity, acceleration, heading, etc.). In some embodiments, input circuit 170 facilitates integrating vehicle control system 110 with other systems. For example, input circuit 170 may geospatial data from a GPS receiver and may format the geospatial data for estimation circuit 180.

Estimation circuit 180 may facilitate determining vehicle parameters. In various embodiments, estimation circuit 180 receives data from input circuit 170 and uses the received data to estimate vehicle parameters (e.g., slip angles, tire stiffness, etc.). In various embodiments, estimation circuit 180 implements a feedback control system as described in detail below with reference to FIGS. 3-4B. In various embodiments, estimation circuit 180 receives positional data from input circuit 170 and/or sensor(s) 140. For example, estimation circuit 180 may receive geospatial data from a GPS receiver. Additionally or alternatively, estimation circuit 180 may use known vehicle characteristics to determine vehicle parameters. For example, estimation circuit 180 may use a mass and/or a size of vehicle 10 to determine slip angles associated with vehicle 10. In some embodiments, estimation circuit 180 receives vehicle characteristics (e.g., mass, size, etc.) from sensor(s) 140. For example, sensor(s) 140 may measure a loaded mass of vehicle 10 (e.g., a mass of vehicle 10 when vehicle 10 is loaded with cargo, etc.) and send the loaded mass to estimation circuit 180.

Controller circuit 190 may facilitate control of vehicle 10. For example, controller circuit 190 may receive a slip angle from estimation circuit 180 and generate control signals for primary mover 130 to operate vehicle 10. As another example, controller circuit 190 may receive a slip angle from estimation circuit 180 and adjust a steering angle based on the slip angle. In some embodiments, controller circuit 190 interfaces with other systems. For example, controller circuit 190 may receive a vehicle parameter (e.g., slip angles, tire stiffness, etc.) from estimation circuit 180 and interface with an anti-lock braking system (ABS) and/or a traction control system (TCS). In some embodiments, controller circuit 190 facilitates autonomous control of vehicle 10. For example, controller circuit 190 may adjust autonomous steering control signals for vehicle 10 based on a received tire stiffness. Additionally or alternatively, controller circuit 190 may transmit information to HMI 120 for display to a user. For example, controller circuit 190 may cause HMI 120 to display a safety warning to a user in response to a slip angle determined by estimation circuit 180 exceeding a threshold.

Figure 2:
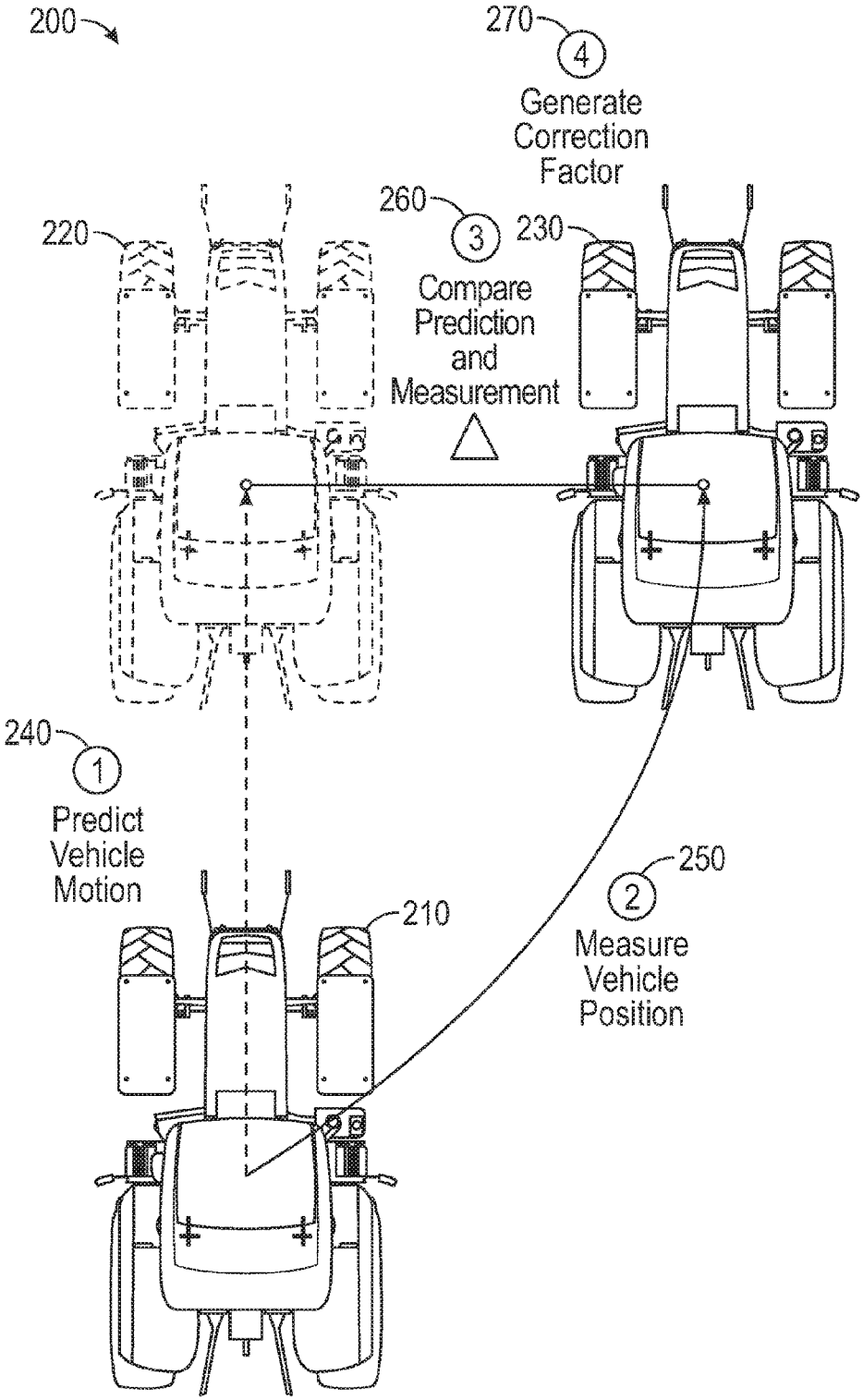
FIG. 2 is a diagram illustrating a process for estimating a vehicle parameter, according to an exemplary embodiment.

Referring now to FIG. 2, a diagram illustrating process 200 for estimating a vehicle parameter is shown, according to an exemplary embodiment. Process 200 may be implemented by vehicle control system 110. In brief summary, process 200 includes predicting vehicle motion based on vehicle motion characteristics (e.g., speed, heading, etc.), measuring a position of the vehicle, comparing the predicted vehicle motion to the measured position of the vehicle, and generating a correction factor (e.g., a vehicle parameter) based on the comparison. Process 200 is described in relation to vehicle 10. In various embodiments, vehicle control system 110 performs process 200 continuously (e.g., in real time, etc.). Additionally or alternatively, vehicle control system 200 may perform process 200 periodically (e.g., every five minutes, upon receiving new input data, etc.).

In various embodiments, vehicle 10 starts at first position 210. In some embodiments, first position 210 is associated with a first time. At step 240, vehicle control system 110 may predict the motion of vehicle 10. In various embodiments, step 240 includes measuring motion characteristics associated with vehicle 10. For example, estimation circuit 180 may receive time-correlated geospatial data, such as a time series of geospatial data points, from sensor(s) 140 and determine a yaw rate, heading, velocity and/or other motion characteristics associated with vehicle 10. In various embodiments, the motion characteristics are associated with vehicle 10 at first position 210 and/or the first time. For example, vehicle control system 110 may determine a yaw rate, heading, velocity, and acceleration associated with vehicle 10 at first position 210 and first time and use the determined values to predict the motion of vehicle 10. In various embodiments, predicting the motion of vehicle 10 includes determining a future position and/or orientation of vehicle 10. For example, vehicle control system 110 may determine a predicted geospatial location and/or vehicle characteristics (e.g., yaw rate, heading, velocity, etc.) for vehicle 10 at a second time. In various embodiments, step 240 includes determining predicted position 220. In various embodiments, predicted position 220 is associated with a second time. In some embodiments, the second time is after the first time associated with first position 210.

At step 250, vehicle control system 110 measures a position of vehicle 10. In various embodiments, step 250 includes determining second position 230. In various embodiments, step 250 is performed at the second time. For example, vehicle control system 110 may receive geospatial data from sensor(s) 140 to determine a location of vehicle 10 at the second time. In some embodiments, step 250 includes determining vehicle motion characteristics (e.g., yaw rate, heading, velocity, etc.) associated with vehicle 10 at the second time.

At step 260, vehicle control system 110 compares predicted position 220 to second position 230. In various embodiments, step 260 includes performing an operation using predicted position 220 and second position 230. For example, vehicle control system 110 may determine a difference between a yaw rate associated with predicted position 220 and a yaw rate associated with second position 230. Additionally or alternatively, vehicle control system 110 may determine a ratio between a velocity associated with predicted position 220 and a velocity associated with second position 230. In some embodiments, vehicle control system 110 determine a physical offset between the location of predicted position 220 and the location of second position 230. For example, vehicle control system 110 may determine that second position 230 is ten feet north and five feet south of predicted position 220.

At step 270, vehicle control system 110 may generate a correction factor. In various embodiments, vehicle control system 110 generates the correction factor based on the comparison between predicted position 220 and second position 230. In various embodiments, step 270 includes determining a vehicle parameter (e.g., a slip angle, tire stiffness, cornering stiffness, etc.) that accounts for a difference between predicted position 220 and second position 230. As a non-limiting example, vehicle control system 110 may determine that a difference between predicted position 220 and second position 230 can be attributed to an interaction between tires of vehicle 10 and the ground (e.g., wet soil causing vehicle 10 to slip and veer off course, etc.). In various embodiments, step 270 includes implementing a feedback control system as described below in reference to FIGS. 3-4B.

Figure 3:
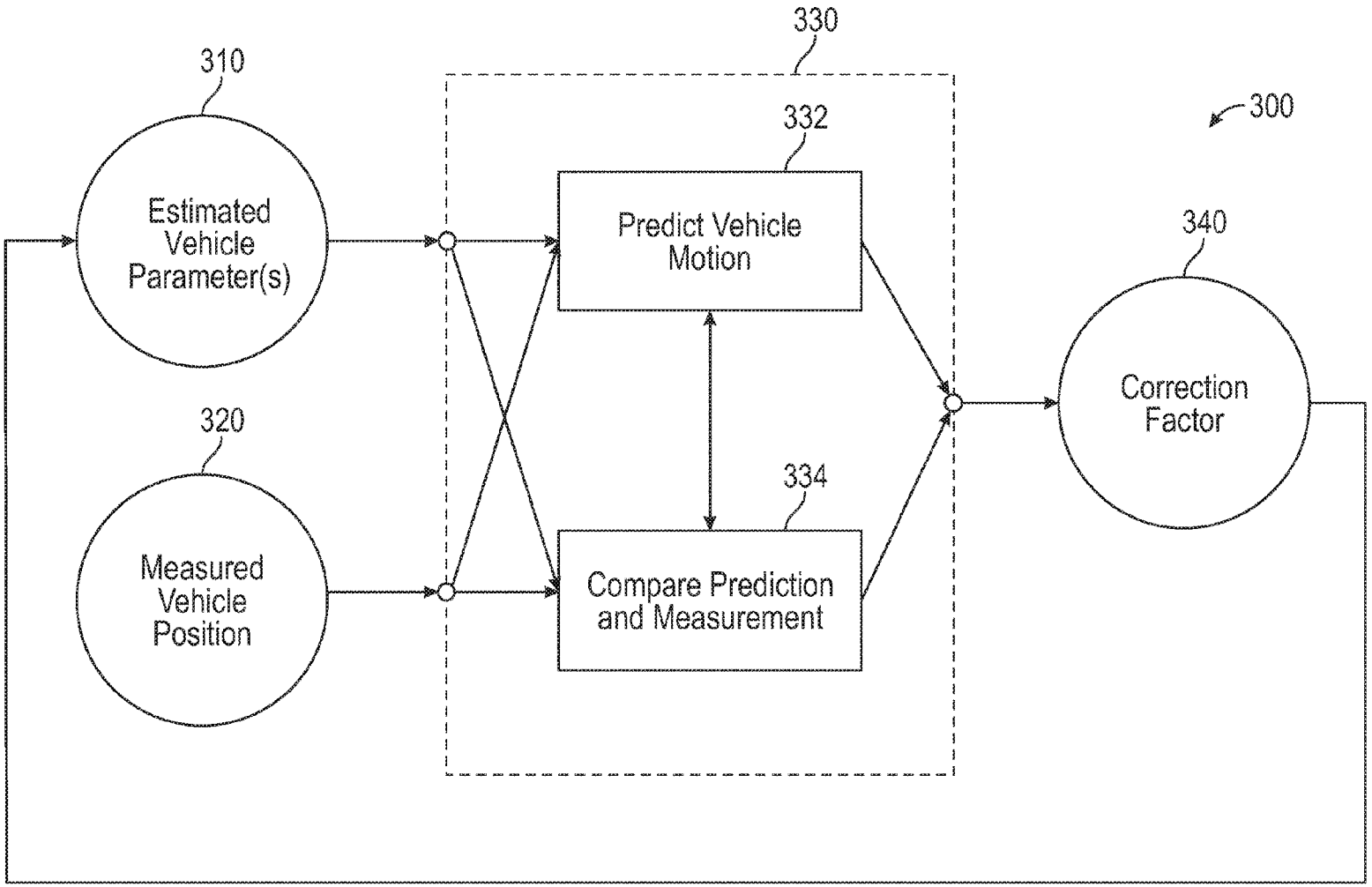
FIG. 3 is a block diagram of a feedback control loop for performing the process of FIG. 2, according to an exemplary embodiment.

Referring now to FIG. 3, feedback control loop 300 for determining a vehicle parameter is shown, according to an exemplary embodiment. In various embodiments, estimation circuit 180 implements feedback control loop 300. Feedback control loop 300 is shown to include estimated vehicle parameter(s) 310. Estimated vehicle parameter(s) 310 may include a slip angle, a tire stiffness, a cornering stiffness and/or the like. For example, estimated vehicle parameter(s) 310 may include previously computed vehicle parameters (e.g., a slip angle, tire stiffness, cornering stiffness, etc.) fed back into feedback control loop 300. Additionally or alternatively, estimated vehicle parameter(s) 310 may include position and/or orientation data. For example, estimated vehicle parameter(s) 310 may include geospatial data and/or motion characteristics (e.g., yaw rate, velocity, acceleration, heading, etc.). In some embodiments, estimated vehicle parameter(s) 310 include a single value. Additionally or alternatively, estimated vehicle parameter(s) 310 may include multiple values. Feedback control loop 300 may include measured vehicle position 320. In various embodiments, measured vehicle position 320 includes geospatial data associated with vehicle 10. Additionally or alternatively, measured vehicle position 320 may include motion characteristics (e.g., yaw rate, velocity, acceleration, heading, etc.) associated with vehicle 10. In some embodiments, sensor(s) 140 provide measured vehicle position 320.

In various embodiments, control block 330 receives estimated vehicle parameter(s) 310 and/or measured vehicle position 320 and generates correction factor 340. Correction factor 340 may include a vehicle parameter. For example, correction factor 340 may include a tire stiffness associated with vehicle 10. In various embodiments, control block 330 represents a control law and/or control scheme used to calculate a vehicle parameter (e.g., a tire stiffness, slip angle, etc.). In various embodiments, vehicle controls system 110 implements control block 330. In some embodiments, control block 330 is or includes a linear controller. Additionally or alternatively, control block 330 may be or include a non-linear controller. In some embodiments, control block 330 is implemented using machine-learning. For example, control block 330 may be or include a state estimation system (e.g., fuzzy logic system, neural network, linear/non-linear observers, Bayesian estimation system, etc.). In some embodiments, control block 330 implements statistical inference filtering. For example, control block 330 may implement a Kalman filter and/or a particle filter. In some embodiments, control block 330 is performed in real time. Additionally or alternatively, control block 330 may be performed using timings. For example, control block 330 may implement fixed lag, variable lag, adaptive lag, and/or the like. As a further example, vehicle control system 110 may perform control block 330 on a fixed interval, a variable interval, an adaptive interval, and/or the like.

Control block 330 is shown to include first block 332 and second block 334. It should be understood that first block 332 and second block 334 are meant to illustrate possible functions performed by control block 330, however other functions are possible and within the scope of the present disclosure. First block 332 may predict the motion of vehicle 10. For example, vehicle control system 110 may implement an algorithm to predict the motion of vehicle 10. In various embodiments, first block 332 includes predicting a future position of vehicle 10 as described above with reference to FIG. 2. Additionally or alternatively, first block 332 may include predicting one or more motion characteristics. For example, vehicle control system 110 may predict a yaw rate, a velocity, a heading, and a geospatial location of vehicle 10 at a second time. In some embodiments, vehicle control system 110 models vehicle 10 using the following equations:

$$\ddot{x} = \dot{\psi}\dot{y} = a_x$$

$$\ddot{y} = -\dot{\psi}\dot{x} + \frac{2}{m}(F_{c,f}\cos\delta_f + F_{c,r})$$

$$\ddot{\psi} = \frac{2}{I_z}(l_f F_{c,f} - l_r F_{c,r})$$

$$\dot{X} = \dot{x}\cos\psi - \dot{y}\sin\psi$$

$$\dot{Y} = \dot{x}\sin\psi - \dot{y}\cos\psi$$

where $\ddot{x}$ is a longitudinal acceleration in a body frame, $\ddot{y}$ is a lateral acceleration in the body frame, $\ddot{\psi}$ is a yaw acceleration, $\dot{X}$ is a longitudinal velocity of an inertial frame, $\dot{Y}$ is a lateral velocity of the inertial frame, $\dot{\psi}$ is a yaw rate, $\dot{y}$ is a lateral speed in the body frame, $a_x$ is a longitudinal acceleration of a center of mass of the body within the inertial frame, m is the vehicle mass, $F_{c,f}$ is a lateral tire force at the front wheels, $\delta_f$ is a front steering angle $F_{c,r}$, is a lateral tire force at the rear wheels, $I_z$ is a yaw inertia, $l_f$ is a distance from the center of mass of the body to the front axle, $l_r$ is a distance from the center of mass of the body to the rear axle, $\dot{x}$ is a longitudinal speed in the body frame, and is an inertial heading.

Second block 334 may compare the predicted vehicle motion and the measured vehicle motion. For example, second block 334 may compare the output of first block 332 and measured vehicle position 320. In various embodiments, second block 334 includes comparing motion characteristics. For example, second block 334 may include comparing $\psi_m$ and $\psi_p$ where $\psi_m$ is a measured inertial heading and $\psi_p$ is a predicted inertial heading. Additionally or alternatively, second block 334 may include comparing $\dot{\psi}_m$ and $\dot{\psi}_p$ where $\dot{\psi}_m$ is a measured yaw rate and $\dot{\psi}_p$ is a predicted yaw rate. In various embodiments, the output of second block 334 is correction factor 340. In some embodiments, correction factor 340 includes a vehicle parameter. For example, correction factor 340 may include a slip angle associated with a difference between $\psi_m$ and $\psi_p$. Additionally or alternatively, the vehicle parameter may be generated based on correction factor 340. For example, vehicle control system 110 may use correction factor 340 to calculate a slip angle associated with vehicle 10.

Figure 4A:
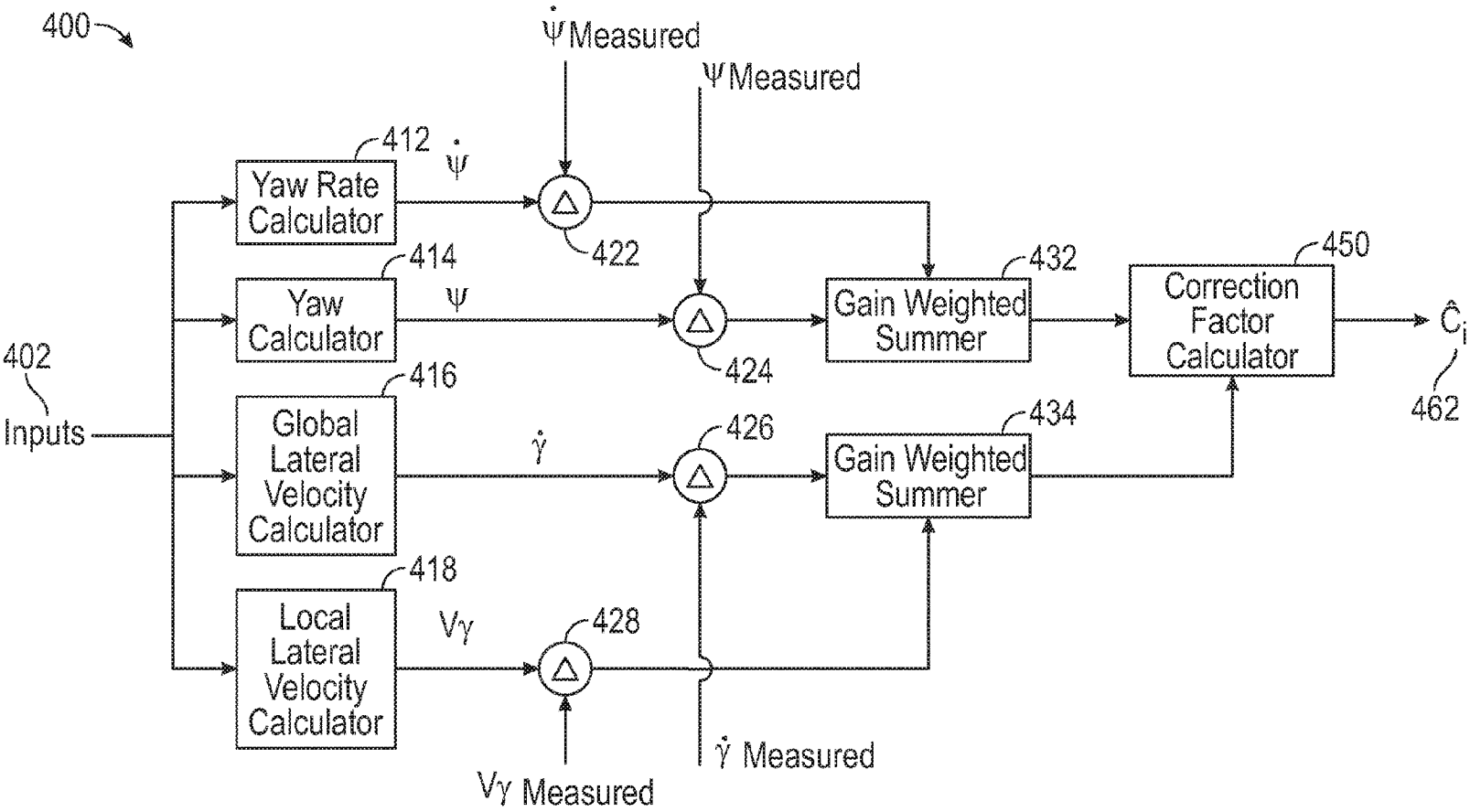
FIG. 4A is a block diagram of a control system that may be implemented by the vehicle control system of FIG. 1, according to an exemplary embodiment.
Figure 4B:
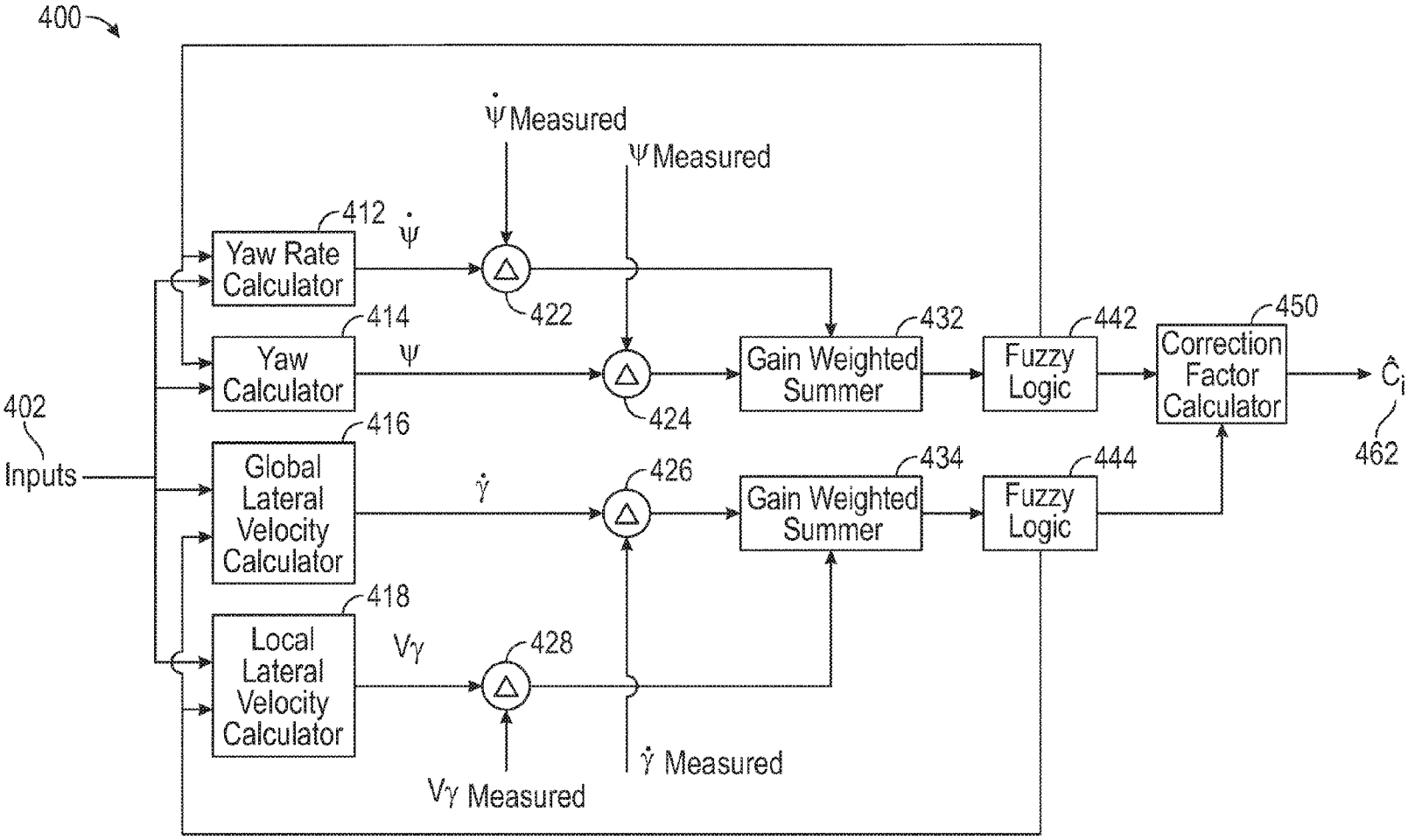
FIG. 4B is another block diagram of a control system that may be implemented by the vehicle control system of FIG. 1, according to an exemplary embodiment.

Referring now to FIGS. 4A-4B, a block diagram of a control system 400 that may be implemented by vehicle control system 110 is shown, according to an exemplary embodiment. In various embodiments, control system 400 receives inputs 402. In some embodiments, inputs 402 include steering angle $\delta$, yaw rate $\dot{\psi}$, inertial heading $\psi$, and lateral vehicle speed $v_y$. Additionally or alternatively, inputs 402 may include output(s) 462. For example, output(s) 462 may be fed back into control system 400. In some embodiments, control system 400 includes other inputs. For example, vehicle control system 110 may utilize vehicle characteristics such as a wheelbase of vehicle 10, a mass of vehicle 10, an inertia of vehicle 10, a center of mass of vehicle 10, and/or the like. In some embodiments, control system 400 utilizes motion characteristics received from sensor(s) 140. For example, sensor(s) 140 may measure a heading of vehicle 10, a heading rate of vehicle 10, a north/east velocity of vehicle 10, a lateral velocity of vehicle 10, and/or a steering angle of vehicle 10.

In various embodiments, control system 400 includes yaw rate calculator 412, yaw calculator 414, global lateral velocity calculator 416, local lateral velocity calculator 418, comparators 422-428, gain weighted summer 432 and 434, and correction factor calculator 450. In some embodiments, control system 400 includes a different number and/or arrangement of components. Yaw rate calculator 412 may calculate a yaw rate $\dot{\psi}$. In some embodiments, yaw rate calculator 412 implements the following equation:

$$\dot{\psi} = \int \frac{2}{I_z}(C_f \delta l_f \cos(\delta) - C_f l_f \cos(\delta)\alpha_f + C_r l_r \alpha_r)$$

where $C_f$ is a cornering stiffness of a front tire, $\alpha_f$ is a tire slip angle of a front tire, $C_r$ is a cornering stiffness of a rear tire, and $\alpha_r$, is a tire slip angle of a rear tire.

Yaw calculator 414 may calculate an inertial heading $\psi$. In some embodiments, yaw calculator 414 implements the following equation:

$$\psi = \int \dot{\psi}$$

Global lateral velocity calculator 416 may calculate a lateral speed in the body frame $\dot{y}$. In some embodiments, global lateral velocity calculator 416 implements the following equation:

$$\dot{y} = \int \frac{1}{m}(2C_f \delta \cos(\delta) - 2C_f \cos(\delta)\alpha_f - 2C_r \alpha_r - v_x m\dot{\theta})$$

where $v_x$ is a longitudinal vehicle speed, and $\dot{\theta}$ is an angular velocity of the center of mass of the vehicle with respect to a longitudinal axis of the vehicle.

Local lateral velocity calculator 418 may calculate a lateral vehicle speed $v_y$. In some embodiments, local lateral velocity calculator 418 implements the following equation:

$$v_y = V\sin\left(\sin^{-1}\left(\frac{v_x}{V}\right) - \sin^{-1}\left(\frac{\dot{x}}{V}\right) + \sin^{-1}\left(\frac{\dot{y}}{V}\right)\right)$$

where $$V = \sqrt{v_x^2 + v_y^2}.$$

Comparators 422-428 may perform a comparison operation on inputs to produce an output. For example, comparator 422 may implement output=$\dot{\psi}_m - \dot{\psi}_p$. In various embodiments, the outputs of yaw rate calculator 412, yaw calculator 414, global lateral velocity calculator 416, and local lateral velocity calculator 418 are predicted parameters. In various embodiments, comparators 422-428 determine a difference. Additionally or alternatively, comparators 422-428 may implement a different operation (e.g., determine a ratio, a weighted sum, etc.).

Gain weighted summer 432 and 434 may perform a weighted summation operation on inputs to produce an output. For example, gain weighted summer 432 may implement output=$K_1\psi + K_2\psi$ where $K_1$ and $K_2$ are gain values. In some embodiments, $K_1$ and $K_2$ are user configurable (e.g., determined by a user, determined as part of a configuration process, etc.). Additionally or alternatively, $K_1$ and $K_2$ may be determined by vehicle control system 110. For example, vehicle control system 110 may adjust $K_1$ and $K_2$ based on operational data to determine a value for $K_1$ and $K_2$ that gives the most accurate output(s) 462. As a further example, $K_1$ and $K_2$ may be determined using a membership selection function. In various embodiments, gain weighted summer 432 and 434 receive inputs from comparators 422-428. For example, gain weighted summer 432 may receive the output of comparator 422 and 424. In various embodiments, gain weighted summer 432 and 434 perform an addition operation. Additionally or alternatively, gain weighted summer 432 and 434 may implement a different operation (e.g., determine a ratio, a difference, etc.).

Correction factor calculator 450 may generate a correction factor. In various embodiments, the correction factor is a vehicle parameter. For example, the correction factor may include a slip angle. In various embodiments, correction factor calculator 450 produces output(s) 462. Output(s) 462 may include a tire cornering stiffness. For example, output(s) 462 may include $C_f$ and $C_r$. Additionally or alternatively, output(s) 462 may include a cornering stiffness associated with each tire of vehicle 10 (e.g., if vehicle 10 has six tires installed, output(s) 462 may include a cornering stiffness associated with each of the six tires). In various embodiments, correction factor calculator 450 determines output(s) 462 by adjusting one or more values associated with output(s) 462 to minimize an error associated with a predicted position of vehicle 10 and a measured position of vehicle 10 at the second time, as described above in reference to FIG. 2. For example, correction factor calculator 450 may determine a value for $C_f$ and $C_r$ that accounts for a difference in the measured position of vehicle 10 and the predicted position of vehicle 10 (e.g., a determined tire cornering stiffness and/or slip angle caused vehicle 10 to deviate from the predicted position by the observed amount, etc.). In some embodiments, correction factor calculator 450 implements one or more algorithms. For example, correction factor calculator 450 may implement a first algorithm to determine $C_f$ and a second algorithm to determine $C_r$. Additionally or alternatively, correction factor calculator 450 may be or include a machine-learning element. For example, correction factor calculator 450 may include a neural network trained using a dataset of vehicle motion corresponding to different vehicle parameters (e.g., slip conditions, tire stiffnesses, etc.) and configured to determine output(s) 462 given the output of gain weighted summer 432 and 434.

Referring now specifically to FIG. 4B, control system 400 may include fuzzy logic elements 442 and 444. Fuzzy logic elements 442 and 444 may facilitate updating output(s) 462 based on a confidence in the measured motion characteristics (e.g., $\dot{\psi}$m, $\psi_m$, $v_{y,m}$, $\dot{y}_m$, etc.). For example, fuzzy logic elements 442 and 444 may facilitate rejecting noisy values of $\dot{\psi}_m$. In various embodiments, fuzzy logic elements 442 and 444 implement a fuzzy logic algorithm that analyzes a numerical stability of output(s) 462 and a confidence associated with the measured motion characteristics to determine a confidence in output(s) 462. In various embodiments, fuzzy logic elements 442 and 444 facilitate real time determination of output(s) 462. For example, vehicle control system 110 may continuously determine a cornering stiffness associated with tires of vehicle 10 and display the determined cornering stiffness to an operator in real time.

Figure 5:
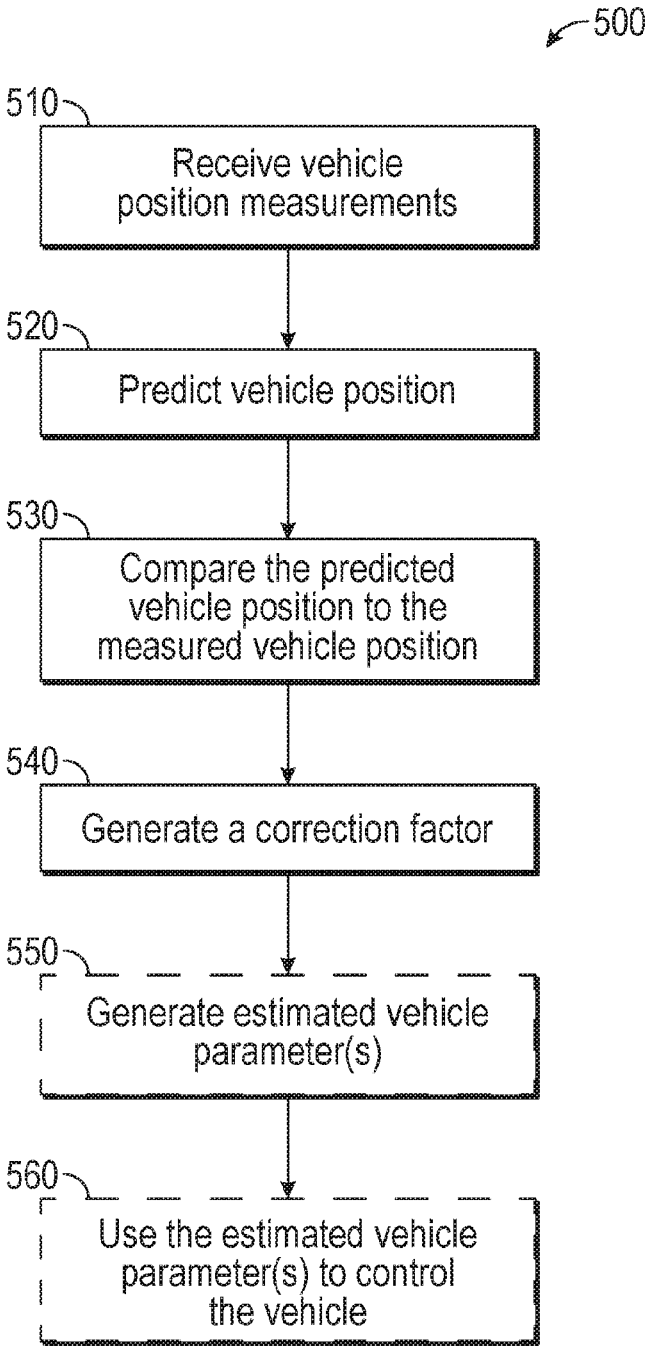
FIG. 5 is a flow diagram of a method of determining a vehicle parameter, according to an exemplary embodiment.

Referring now to FIG. 5, method 500 of determining a vehicle parameter is shown, according to an exemplary embodiment. In various embodiments, vehicle control system 110 implements method 500. In various embodiments, method 500 is used to determine $C_f$ and/or $C_r$. Additionally or alternatively, method 500 may determine other vehicle parameters (e.g., slip angles, tire stiffness, etc.). In some embodiments, method 500 may be used to calibrate vehicle 10 and/or vehicle control system 110. For example, method 500 may be performed on a surface having known characteristics (e.g., a paved surface, a road, etc.) to determine tire parameters associated with tires of vehicle 10, and thereby determine a type of tire installed on vehicle 10. As a further example, upon detecting a change in tires, vehicle control system 110 may perform method 500 to determine a type of tire installed on vehicle 10 and save the tire type for future use. Additionally or alternatively, method 500 may be performed in real time to facilitate vehicle operation. For example, vehicle control system 110 may continuously implement method 500 to update a cornering stiffness associated with different environmental conditions experienced by vehicle 10 and use the cornering stiffness to augment a TCS.

At step 510, vehicle control system 110 may receive vehicle position measurements. For example, vehicle control system 110 may receive geospatial data from sensor(s) 140. In various embodiments, step 510 includes receiving multiple position measurements. For example, vehicle control system 110 may receive timeseries geospatial data (e.g., first geospatial data associated with a first time, second geospatial data associated with a second time, etc.) from sensor(s) 140. In some embodiments, step 510 includes computing one or more motion characteristics (e.g., a heading, a velocity, a yaw rate, an acceleration, etc.) based on the position measurements. Additionally or alternatively, vehicle control system 110 may receive the one or more motion characteristics from sensor(s) 140.

At step 520, vehicle control system 110 may predict a position of vehicle 10. In various embodiments, vehicle control system 110 analyzes the position measurements to predict a future position of vehicle 10, as described in detail above with reference to FIGS. 2-4B. For example, vehicle control system 110 may determine a location and/or a heading associated with vehicle 10 at a future time. In various embodiments, step 520 includes determining one or more motion characteristics. In various embodiments, vehicle control system 110 performs step 520 using known vehicle parameters (e.g., vehicle mass, vehicle wheel base, etc.), estimated parameters (e.g., a previously computed cornering stiffness, etc.), and/or other information (e.g., vehicle position measurements, etc.).

At step 530, vehicle control system 110 may compare the predicted vehicle position to the measured vehicle position. In various embodiments, step 530 includes comparing predicted motion characteristics to measured motion characteristics as described in detail with reference to FIGS. 4A-4B above. For example, step 530 may include comparing $\dot{\psi}_m$ and $\dot{\psi}_p$. In some embodiments, step 530 includes comparing a prediction location of vehicle 10 to a measured location of vehicle 10. For example, vehicle control system 110 may predict, at a first point in time, a location of vehicle 10 associated with a second point in time, and may compare the measured location of vehicle 10 at the second point in time to the predicted location of vehicle 10 at the second point in time.

At step 540, vehicle control system 110 may generate a correction factor. In various embodiments, the correction factor includes a vehicle parameter. For example, the correction factor may include a cornering stiffness associated with a tire of vehicle 10. In various embodiments, vehicle control system 110 generates the correction factor based on the difference between the predicted position of vehicle 10 and the measured position of vehicle 10 as described in detail above with reference to FIGS. 4A-4B. In various embodiments, step 540 includes updating an existing vehicle parameter. For example, vehicle control system 110 may update an estimated value of $C_f$ and/or $C_r$.

At step 550, vehicle control system 110 may generate one or more estimated vehicle parameters. For example, step 550 may include determining a value of $C_f$ and/or $C_r$. Additionally or alternatively, step 550 may include determining other vehicle parameters. For example, step 550 may include determining a tire type. In various embodiments, vehicle control system 110 determines the one or more estimated vehicle parameters based on the correction factor generated in step 540. For example, step 550 may include adjusting a slip angle to account for a difference between a predicted position of vehicle 10 and a measured position of vehicle 10 and determining the one or more estimated vehicle parameters based on the adjusted slip angle. In some embodiments, step 550 is optional. As a non-limiting example, vehicle control system 110 may additionally or alternatively determine when the correction factor and/or estimated vehicle parameter(s) are out of a threshold range and in response may transmit a signal. As an additional non-limiting example, vehicle control system 110 may additionally or alternatively display the correction factor to a user (e.g., via HMI 120, etc.).

At step 560, vehicle control system 110 may use the one or more estimated vehicle parameters to control vehicle 10. For example, vehicle control system 110 may use $C_f$ and/or $C_r$ to control a TCS. As a further example, vehicle control system 110 may use a slip angle to adjust the operation of an autonomous steering controller to ensure vehicle 10 stays on route. Additionally or alternatively, vehicle control system 110 may transmit the one or more estimated vehicle parameters to another system to facilitate further functionality. For example, vehicle control system 110 may transmit a slip angle to HMI 120 to display a real time safety warning to a user if the slip angle exceeds a threshold. In some embodiments, step 560 is optional.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

What is claimed is:

[1. A system for estimating tire parameters for an off-road vehicle in real time, the system comprising:

a processing circuit including a processor and memory, the memory having instructions stored thereon that, when executed by the processor, cause the processing circuit to:

measure a position of the vehicle at a first time;

determine, based on the position, motion characteristics of the vehicle;

predict, based on the motion characteristics, a position of the vehicle at a second time;

measure a position of the vehicle at the second time;

determine a correction factor based on the difference between the predicted position and the measured position of the vehicle at the second time; and determine a tire parameter associated with the vehicle based on the correction factor, wherein the correction factor includes at least one of a slip angle, a tire stiffness, or a cornering stiffness.]

[2. The system of claim 1, wherein the tire parameter is a cornering stiffness.]

[3. The system of claim 1, wherein the tire parameter is a tire type.]

[4. The system of claim 1, wherein the correction factor is associated with an amount of tire slip associated with the difference between the predicted position and the measured position of the vehicle at the second time.]

[5. The system of claim 4, wherein determining the tire parameter includes adjusting the correction factor to account for the difference between the predicted position and the measured position of the vehicle at the second time, wherein the adjusted correction factor is the tire parameter.]

[6. The system of claim 4, wherein the difference between the predicted position and the measured position of the vehicle at the second time includes two or more parameters associated with the vehicle position and wherein the method includes weighting each of the two or more parameters based on a contribution each of the two or more parameters make to the difference between the predicted position and the measured position of the vehicle at the second time.]

[7. The system of claim 1, wherein the vehicle is an agricultural vehicle.]

[8. The system of claim 1, wherein measuring the position of the vehicle at the first and second times includes receiving position information from a GPS receiver associated with the vehicle.]

[9. The system of claim 1, wherein the tire parameter is determined further based on vehicle characteristics associated with the vehicle.]

[10. The system of claim 1, wherein the processing circuit is further configured to control an operation of the vehicle based on the tire parameter.]

[11. The system of claim 1, wherein correction factor is determined based on the comparison of a yaw rate, the inertial heading, the lateral speed of the body frame, and the lateral speed of the off-road vehicle.]

[12. A method of estimating tire parameters for an off-road vehicle in real time, the method comprising:

measuring a position of the vehicle at a first time;

determining, based on the position, motion characteristics associated with the vehicle;

predicting, based on the motion characteristics, a position of the vehicle at a second time;

measuring a position of the vehicle at the second time;

determining a correction factor based on the difference between the predicted position and the measured position of the vehicle at the second time; and determining a tire parameter associated with the vehicle based on the correction factor, wherein the correction factor includes at least one of a slip angle, a tire stiffness, or a cornering stiffness.]

[13. The method of claim 12, wherein the tire parameter is a cornering stiffness.]

[14. The method of claim 12, wherein the tire parameter is a tire type.]

[15. The method of claim 12, wherein the correction factor is associated with an amount of tire slip associated with the difference between the predicted position and the measured position of the vehicle at the second time.]

[16. The method of claim 15, wherein determining the tire parameter includes adjusting the correction factor to account for the difference between the predicted position and the measured position of the vehicle at the second time, wherein the adjusted correction factor is the tire parameter.]

[17. The method of claim 15, wherein the difference between the predicted position and the measured position of the vehicle at the second time includes two or more parameters associated with the vehicle position and wherein the method includes weighting each of the two or more parameters based on a contribution each of the two or more parameters make to the difference between the predicted position and the measured position of the vehicle at the second time.]

[18. The method of claim 12, wherein the vehicle is an agricultural vehicle.]

[19. The method of claim 12, wherein correction factor is determined based on the comparison of a yaw rate, the inertial heading, the lateral speed of the body frame, and the lateral speed of the off-road vehicle.]

[20. An agricultural vehicle having one or more tires and a vehicle control system including a processor and memory, the memory having instructions stored thereon that, when executed by the processor, cause the processor to:

receive a position measurement associated with the agricultural vehicle at a first time;

determine, based on the position, motion characteristics associated with the agricultural vehicle;

generate, based on the motion characteristics, a predicted position of the agricultural vehicle at a second time;

measure a position of the agricultural vehicle at the second time;

determine a correction factor based on the difference between the predicted position and the measured position of the vehicle at the second time; and determine a cornering stiffness associated with at least one of the one or more tires based on the correction factor, wherein the correction factor includes at least one of a slip angle, a tire stiffness, or a cornering stiffness.]

*21. A method of operating an off-road vehicle in real time, the method comprising:*

*measuring a first position of the off-road vehicle at a first time;*

*determining, based on the first position, motion characteristics associated with the off-road vehicle;*

*predicting, based on the motion characteristics, a second position of the off-road vehicle at a second time;*

*measuring a third position of the off-road vehicle at the second time;*

*determining a correction factor based on a difference between the second position and the third position of the off-road vehicle at the second time;*

*determining a tire parameter associated with the off-road vehicle based on the correction factor; and*

*adjusting a steering angle of the off-road vehicle based in part on the determined tire parameter.*

*22. The method of claim 21, wherein the correction factor includes at least one of a slip angle, a tire stiffness, or a cornering stiffness.*

*23. The method of claim 21, wherein the method further comprises:*

*continuously determining the correction factor; and*

*displaying the determined correction factor to a vehicle operator in real time.*

*24. The method of claim 21, wherein the method further comprises:*

*training a neural network using a dataset of vehicle motion corresponding to different vehicle parameters; and*

*determining the correction factor through machine learning using the neural network.*

*25. The method of claim 21, wherein the correction factor is associated with an amount of tire slip associated with the difference between the second position and the third position of the off-road vehicle at the second time.*

*26. The method of claim 25, wherein determining the tire parameter includes adjusting the correction factor to account for the difference between the second position and the third position of the off-road vehicle at the second time, wherein the adjusted correction factor is the tire parameter.*

*27. The method of claim 25, wherein the difference between the second position and the third position of the off-road vehicle at the second time includes two or more parameters associated with the third position and wherein the method further includes weighting each of the two or more parameters based on a contribution each of the two or more parameters make to the difference between the second position and the third position of the off-road vehicle at the second time.*

*28. The method of claim 21, wherein the off-road vehicle is an agricultural vehicle.*

*29. A system for autonomously controlling a vehicle in real time, the system comprising:*

*a processing circuit including a processor and memory, the memory having instructions stored thereon that, when executed by the processor, cause the processing circuit to:*

*measure a first position of the vehicle at a first time;*

*determine, based on the first position, motion characteristics associated with the vehicle;*

*predict, based on the motion characteristics, a second position of the vehicle at a second time;*

*measure a third position of the vehicle at the second time;*

*determine a correction factor based on a difference between the second position and the third position of the vehicle at the second time;*

*determine a tire parameter associated with the vehicle based on the correction factor; and*

*autonomously control operation of the vehicle by adjusting autonomous steering control signals based on the tire parameter.*

*30. The system of claim 29, wherein the correction factor includes at least one of a slip angle, a tire stiffness, or a cornering stiffness.*

*31. The system of claim 30, wherein the instructions further cause the processing circuit to:*

*continuously determine the correction factor; and*

*display the determined correction factor to a vehicle operator in real time.*

*32. The system of claim 29, wherein the instructions further cause the processing circuit to:*

*train a neural network using a dataset of vehicle motion corresponding to different vehicle parameters; and*

*determine the correction factor through machine learning using the neural network.*

*33. The system of claim 29, wherein the correction factor is associated with an amount of tire slip associated with the difference between the second position and the third position of the vehicle at the second time.*

*34. The system of claim 29, wherein measuring the first position and the third position of the vehicle at the first and second times includes receiving position information from a GPS receiver associated with the vehicle.*

*35. The system of claim 29, wherein the vehicle is an agricultural vehicle.*

*36. The system of claim 29, wherein the tire parameter is generated further based on vehicle characteristics associated with the vehicle.*

*37. An agricultural vehicle having one or more tires and a vehicle control system including a processor and memory, the memory having instructions stored thereon that, when executed by the processor, cause the processor to:*

*measure a first position of the agricultural vehicle at a first time;*

*determine, based on the first position, motion characteristics associated with the agricultural vehicle;*

*predict, based on the motion characteristics, a second position of the agricultural vehicle at a second time;*

*measure a third position of the agricultural vehicle at the second time;*

*determine a correction factor based on a difference between the second position and the third position of the agricultural vehicle at the second time;*

*determine a tire parameter associated with the agricultural vehicle based on the correction factor; and*

*autonomously control operation of the agricultural vehicle by adjusting autonomous steering control signals based on the tire parameter.*

*38. The agricultural vehicle of claim 37, wherein the instructions further cause the processor to:*

*continuously determine the correction factor; and*

*display the determined correction factor to a vehicle operator in real time.*

*39. The agricultural vehicle of claim 37, wherein the instructions further cause the processor to:*

*train a neural network using a dataset of vehicle motion corresponding to different vehicle parameters; and*

*determine the correction factor through machine learning using the neural network.*

* * * * *